Patented Mar. 14, 1950

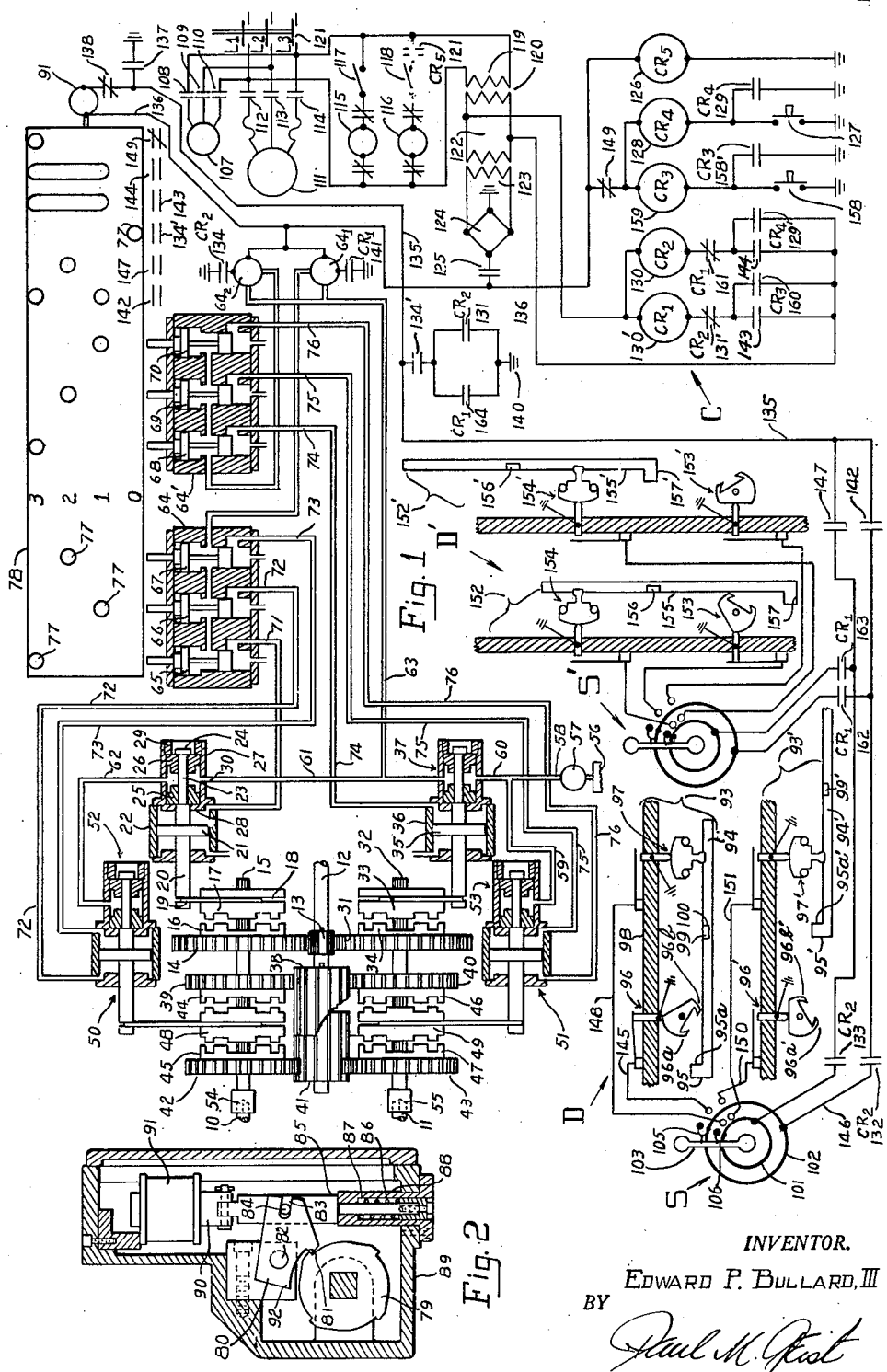

2,500,796

UNITED STATES PATENT OFFICE 2,500,796

POSITIONING APPARATUS

Edward P. Bullard, III, Fairfield, Conn., assignor to The Bullard Company, a corporation of Connecticut Application March 24, 1947, Serial No. 736,701

21 Claims. (Cl. 74—333)

1

This invention relates to apparatus for automatically positioning a member along a path of travel.

It deals with subject matter similar to that shown, described and claimed in applications Serial Numbers 736,702 and 736,703, filed March 24, 1947, in the name of Edward P. Bullard, III, and application Serial Number 736,704, filed March 24, in the names of Edward P. Bullard, III, et al.

The primary object of the invention is the provision of an apparatus which can effect the movement of a member along a path to any one at a time of more than two locations, and always such that the movement is initially in the correct direction toward the selected location regardless of the previous location of the member along the path.

Other objects include, the provision of such an apparatus in which the movement of the member for any selected location is always initiated in the correct direction by an always identical, non-selective operation; the provision of such an apparatus in which the member is ultimately moved to the selected location at a relatively slow speed, although it is moved at a relatively rapid speed to an intermediate location which always bears a definite relation to the finally-selected location; the provision of such an apparatus wherein the member may be moved to more than two locations along its path of travel by a power transmission that is so controlled that upon a selection of a desired location being made and an operation initiated by a non-selective act, a further selection is automatically effected so that the member initially moves in the correct direction toward the selected location regardless of the previous location of the member along the path; and the provision of an apparatus including a member movable in two directions along a path of travel such that it can be positioned at any pre-determined location therealong and embodying a control which when rendered effective by a non-selective act automatically selects and initiates the correct direction of movement of the member toward the predetermined location.

Still other objects include, the provision of such an apparatus wherein the functions of movement of the movable member are initiated by the step-by-step indexing of a drum which contains dogs for positively actuating fluid-control valves; the provision of such an apparatus wherein the function drum is indexed from station to station by the cooperative action of a rotary fluid motor and an escapement mechanism;

2 and the provision of such an apparatus wherein a detector for determining the final, selected locations of the movable member involves the use of adjustable actuators requiring a support of only slightly greater length than the path of travel of the movable member.

The above, as well as other objects and novel features of the invention will become apparent from the following specification and accompanying drawing in which:

Figure 1 represents a schematic diagram of apparatus to which the principles of the invention have been applied; and Figure 2 is a detail of construction showing the solenoid-operated escapement mechanism for effecting indexing of the function drum.

The principles of the invention are applicable to any apparatus wherein it is desired to locate a member at any one at a time of more than two locations along a path of motion. They will be described as applied to controlling the rotation of two shafts each of which may move separate members along separate paths in different planes such as is the case in a horizontal boring mill; or to move one member along intersecting paths such as is the case in universally moving a member within a single plane.

Referring to the drawing, the shafts 10, 11 are adapted to be rotated in either direction by a transmission including a drive shaft 12 that receives its power from any type of prime mover (not shown), such as an electric motor, fluid-operated rotary motor, steam turbine and the like. The shaft 12 is provided with a pinion 13 that meshes with a feed gear 14. Gear 14 is journaled on a shaft 15 and is provided with a clutch face 16 that is adapted to cooperate with a mating clutch 17. The clutch 17 is splined to shaft 15, and is provided with a groove 18 in which a clutch-shifting finger 19 is adapted to ride. Finger 19 is rigidly attached to a piston rod 20 on which a piston 21 is fixed for reciprocation within a cylinder 22.

Rod 20 is provided with a portion 23 of reduced diameter, and a nut 24 is screwed to the end opposite that to which finger 19 is attached. Two discs 25, 26 are slidably mounted on portion 23 within a cylinder 27, the ends of which include annular abutments 28, 29 against which discs 25, 26 are adapted to seat when forced apart by fluid under pressure constantly supplied therebetween through a port 30. From the figure, it is apparent that piston 21 has a greater effective area than discs 25, 26 and, therefore, admission of fluid to the cylinder 22 on the right hand side of piston 21 causes clutch 17 to engage clutch face 16 thereby causing shaft 15 to be rotated at a relatively slow speed. Release of this fluid under pressure instantly permits discs 25 and 26 to separate disengaging clutch 17 from gear 14.

Pinion 13 also meshes with another feed gear 31, journaled on a shaft 32 on which a clutch 33 is splined. The clutch 33 is caused to engage and disengage a mating clutch face 34 on gear 31 by the action of a piston 35 within a cylinder 36, and a neutralizing device 37, all in the manner as clutch 17 is operated by piston 21 and the discs 25, 26 in cylinder 27.

The shaft 12 also supports for rotation with it a gear 38 of substantially larger diameter than pinion 13. Gear 38 meshes with a pair of gears 39, 40 that are, respectively, journaled on the shafts 15 and 32. Additionally, gear 38 meshes with a gear 41 that is journaled on a shaft, the longitudinal axis of which lies in the same horizontal plane as that for shaft 12. Gear 41 extends beyond gear 38 and meshes with a pair of gears 42, 43 also journaled on shafts 15 and 32, respectively. Gears 39, 42 and 40, 43 possess clutch faces 44, 45, 46 and 47. Double faced clutches 48 and 49 are, respectively, splined to shafts 15 and 32, and are engaged with and dis-engaged from their corresponding clutch faces on gears 39, 42, 40 and 43 by fluid operated piston devices 50 and 51 and neutralizing devices 52 and 53 in the same manner as piston 21 and discs 25, 26 engage and disengage clutch 17 with clutch face 16.

From the foregoing it is evident that shaft 15 is rotated at a relatively slow and a relatively rapid rate in one direction by engaging clutch 17 with face 16, and clutch 48 with face 44, respectively. Also that shaft 32 is rotated at a relatively slow and a relatively rapid rate in one direction, respectively, by engaging face 34 with clutch 33, and clutch 49 with face 46. Furthermore, it is evident that shaft 15 is rotated in a reverse direction by engaging clutch 48 with face 45; and shaft 32 is rotated in a reverse direction by engaging clutch 49 with face 47. Shaft 15 is provided with a socket 54 adapted to mesh with the square end of shaft 10; and shaft 32 includes a socket 55 that engages the square end of shaft 11.

For convenience in describing the principles of the invention, it is assumed that shafts 10 and 11 are in a standard horizontal boring mill; that rotation of shaft 10 by gear 14 effects vertically-upward movement of the spindle or a primary means along the vertical standard of the boring mill at a relatively slow or feed rate of speed; rotation of shaft 10 by gear 39 provides vertically-upward movement of said spindle at a relatively rapid or traverse rate; and rotation of shaft 10 by gear 42 provides vertically-downward movement of said spindle at a relatively rapid or traverse rate. Additionally, the operation of shaft 11 by gear 31 effects rightward movement of the work support or another primary means of the boring mill, at a relatively slow or feed rate, as viewed from the end opposite the vertical standard and looking toward said standard; rotation of shaft 11 by gear 40 effects rightward movement of the work support, at a relatively rapid or traverse rate, in the same sense; and rotation of shaft 11 by gear 43 effects leftward movement of the work support, at a relatively rapid or traverse rate, in the same sense. From the foregoing it is evident that the term primary means includes any means which is desired to be located along a path of travel, and in the claims it is intended to cover all reasonable equivalents of tool supports, work supports and the like. Furthermore, the mechanism for moving the primary means along its paths may be screws rotated by shafts 10, 11; pinions meshing with racks on said primary means, or any equivalent thereof.

A conventional hydraulic system is employed to supply fluid, preferably oil under pressure to the various cylinders and includes a source of oil 56 that supplies a pump 57 which delivers the oil under pressure through a line 58. Branches 59, 60, 61 and 62 constantly supply each of the piston neutralizing devices at all times while the pump 57 is operating. A branch 63 delivers oil under pressure to a valve manifold including two parts 64, 64' through solenoid-operated valves $64_1$ and $64_2$, to be described later. Six identical valves 65, 66, 67, 68, 69 and 70 are provided in parts 64, 64'. These valves include differential piston constructions such that normally they are maintained in an elevated condition which exhausts lines 71, 72, 73, 74, 75 and 76 to the atmosphere. Line 71 is adapted to supply oil under pressure to cylinder 22 on the right side of piston 21—the left hand side of which is exhausted to the atmosphere since clutch 17 is adapted to move only in one direction for effecting clutch engagement. Line 72 supplies oil to the left hand face of the piston in device 50, and line 73 supplies oil to the right hand side of said piston. Line 74 supplies oil to the right hand end of cylinder 36, while lines 75 and 76, respectively, supply oil to the right and left hand ends of the piston device 51. Valves 65 to 70 are adapted to be moved to their lower, or active positions by dogs 77 on a function drum 78 adapted to be indexed in a step-by-step fashion about a horizontally-disposed axis. The drum 78 need be indexed to only four stations and always in a sequential order. In the drawing, for convenience, the four stations are all shown in solid, or in a manner showing the drum 78 in developed form. Since it is difficult to provide a mechanical indexing mechanism that will produce 90° rotation of drum 78 for each index, a fluid rotary motor is employed that continuously tends to rotate the drum 78 about its horizontal, longitudinal axis but which is prevented from so doing by the cooperative action between a ratchet 79 and a pawl 80 (Fig. 2) forming an escapement mechanism.

Referring to Fig. 2, the ratchet 79 is provided with four equally-spaced notches or teeth, each adapted to cooperate with a finger 81 of the pawl 80. Pawl 80 is pivotally mounted on a shaft 82, and it includes a slot 83 therein adapted to receive a pin 84 fixed to a vertically reciprocable shaft 85. Shaft 85, normally is urged downwardly by a spring 86 surrounding it and compressed within a chamber 87 formed in a sleeve 88 mounted within the frame 89 supporting the escapement mechanism.

The shaft 85 is pinned to the core 90 of a solenoid 91. Energization of solenoid 91 raises shaft 85, lifting pawl 80 so that ratchet 79 turns clockwise to effect cooperation between the next succeeding notch of the ratchet 79 and finger 81 of pawl 80. Accordingly, shaft 85 must descend rapidly under the influence of spring 86, and upon de-energization of the solenoid 91 in order for finger 81 to engage the next succeeding notch of ratchet 79. A finger 92 is provided on pawl 80 which will engage the next succeeding notch of ratchet 79 should the pawl 80, for any reason, not return immediately after releasing ratchet 79. From the foregoing, it is evident that each time it is desired to index drum 78, it is only necessary to energize solenoid 81.

Inasmuch as each of the primary means moved by the rotation of shafts 10 and 11 is positioned at different locations along its respective path of travel by identical mechanism, only one will be referred to in the following description. Two conditions can exist, either the primary means is on one or the other side of any selected location along its path of travel. So that no constructional inaccuracies will occur in positioning the primary means, it is necessary ultimately to move it always in the same direction at a relatively slow feed rate from an intermediate location to the selected location. This intermediate location always bears a fixed relation to the selected location and is at a relatively small distance therefrom. So that as little time as possible will be consumed in positioning the primary means, it is moved at a relatively rapid traverse rate to the intermediate location. In the present embodiment of the invention, a condition arises, when the primary means is initially on the same side of the selected location as the intermediate location, requiring the interposition of a secondary traverse movement of the primary means. This secondary traverse movement serves to move the primary means from the side of the selected location opposite that from the intermediate location to the proper side of the selected location prior to being moved at a relatively slow speed to the selected location. This secondary traverse movement may be eliminated, such for example in the manner shown, described and claimed in application Serial Number 736,702, filed March 24, 1947, in the name of Edward P. Bullard, III.

A detector or secondary means D comprises a unit 93 for each location within a given job to which the primary means is desired to be positioned. There may be as many units 93 as desired although twenty to thirty usually suffice for most jobs performed on such apparatus as horizontal boring mills. The units 93 in the present embodiment, include a reciprocable, manually-adjustable rod 94 that can conveniently be located so that an electrical switch-actuating surface 95 thereof can be locked in any predetermined accurate position.

The unit 93 also includes a locking switch 96 and a self-returning switch 97. Switch 96 is termed a "locking switch" because it is either open or closed and remains in either position until positively moved by an external force to the other position. Switch 97 is termed a "self-returning" switch because it normally remains open and will re-open when the force is removed that holds it closed.

Switches 96 and 97 are rigidly mounted in spaced relation on an arm 98 that is attached to, and movable with the primary means. Arm 98, therefore, represents the location of the primary means at any instant along its path of travel. Switch 96 cooperates with surfaces 95 and 95a formed on the end of rod 94, while switch 97 cooperates with a cam 99 formed on the side of rod 94. Accordingly, switches 96, 97 are laterally spaced slightly from each other. The type of switch 97 is the same as that shown, described and claimed in application Serial Number 586,799 filed on April 5, 1945, in the name of Edward P. Bullard, III, to which application reference is made for specific details. As described in the above-referred-to application, each switch is extremely thin so that a great many may be mounted on the support 98 within a relatively small space. The switch 96 includes a relatively thin body pivotally mounted and possessing trip fingers 96a and 96b. The finger 96a is adapted to engage surface 95, while finger 96b is adapted to cooperate with surface 95a. The switch 96 is the same as that shown, described and claimed in application Serial Number 736,702, filed March 24, 1947, in the name of Edward P. Bullard, III. The construction and arrangement of switch 96 is such that whenever the primary means is on the right-hand side of the surface 95, switch 96 will always be closed, and when on the left-hand side of said surface switch 96 will always be open.

Each rod 94 is extremely thin also and consumes no more space than its cooperating switches 96, 97 so that twenty to thirty individually-adjustable rods 94 and their cooperating switches 96, 97 consume relatively little space.

The cam 99 is spaced from surface 95 an amount that bears a fixed relation at all times to the surface 95. With arm 98 in a position such that switch 97 is to the right of cam 99, leftward movement of the primary means will cause the end 100 thereof to trip switch 97 and when this occurs switch 96 must be open and lie a relatively short distance to the left of the surface 95 of rod 94, and in the neighborhood of .030 inch. This location is termed, for convenience, an intermediate point or location from which the primary means must always be fed rightwardly until switch 96 is closed by surface 95 engaging finger 96a, thereby stopping the primary means at the final, selected location along its path of travel. From the foregoing it is evident that adjustment of rod 94 not only accurately establishes the location of the final, selected location at which the primary means is to stop (surface 95), but also an intermediate location therefor (end 100 of cam 99). Furthermore, it is evident that there is a fixed relation between the end 100 and the surface 95.

The use of the expression "secondary means" in the claims is intended to cover not only one or more adjustable rods 94 and their cooperating pair or pairs of switches 96, 97, but all reasonable equivalents thereof, whether electro-mechanical, electro-hydraulic, hydraulic, mechanical or electronic.

Since the specific invention contemplates a relatively large number of units 93, including a rod 94 and a pair of switches 96, 97, it also contemplates a selector or tertiary means S for selecting at the will of the operator any of the detector units one at a time. This selector, in the embodiment shown is in the form of an electrical distributor and comprises a pair of current-carrying rings 101, 102 which cooperate with brushes that are attached to a rotatable bar 103 containing a pair of wiping contacts 105, 106. The contacts 105, 106 are adapted to make wiping contact with a pair of contacts for each detector unit 93, which pairs of contacts are arranged annularly about the current-carrying rings 101, 102. It is entirely within the principles of the invention to operate the selector by any mechanism as well as manually whether or not such operation is caused in a definite sequential order. Such devices may be hydraulic, electric or otherwise and they are all within the meaning of the expression "tertiary means for selecting" as used in the claims.

When a selection of one of the detector units 93 is made, by moving bar 103 manually, in the present embodiment, a fourth means is provided which when operated by a non-selective act involving identical action each time it is operated, automatically selects and initiates the proper direction of motion of the primary means so that it initially moves toward the selected location regardless of its previous position. This means in the present embodiment is a control circuit C. This circuit can best be understood by describing its operation, first with the primary means to the right of the final, selected location as defined by surface 95 and thereafter with the primary means to the left of the selected location as defined by surface 95'.

A motor 107, adapted to drive pump 57, is connected across power lines $L_1$, $L_2$ and $L_3$, with switches 108, 109 and 110 normally open for preventing its rotation. A constant speed motor 111, for rotating drive shaft 12, is likewise connected across lines $L_1$, $L_2$ and $L_3$ with switches 112, 113 and 114 normally open for preventing its rotation. Control relays 115, 116 are arranged in parallel across lines $L_1$ and $L_3$ and manually-operable switches 117, 118 are provided for controlling their energization. The circuit for relays 115, 116 also includes a primary 119 of a transformer 120.

Closing main switch 121, energizes the primary 119. Closing switch 117 energizes relay 115 closing switches 108, 109, 110 thereby causing motor 107 to rotate, operating pump 57. Closing switch 118, however, does not energize relay 116 since there is a normally open $CR_5$ switch 121 in its circuit. Energizing the primary 119 induces a current in a secondary 122, which in turn induces a current in another secondary 123 that is connected to a rectifier 124 for supplying low-voltage direct current to part of the control circuit C. Shortly after switch 117 is closed, pump 57 builds up sufficient pressure in the hydraulic system to cause pressure switch 125 to close, thereby energizing $CR_5$ relay 126, which effects closing of $CR_5$ switch 121 thereby energizing relay 116. Energizing relay 116 closes switches 112, 113 and 114 starting motor 111, and the rotation of shaft 12.

With the selector handle 103 in position so that detector unit 93 is effective, closing starting button 127 causes current to flow from ground through switch 127, a $CR_4$ control relay 128, a normally closed switch 149, switch 125, rectifier 124 to ground, energizing $CR_4$ control relay 128. Energizing $CR_4$ control relay 128, closes $CR_4$ switch 129 for holding the former energized upon release of the starting button 127. It also closes $CR_4$ switch 129', whereupon $CR_2$ control relay 130 is energized, closing $CR_2$ switches 131, 132, 133 and 134; and opening $CR_2$ switch 131'. Opening $CR_2$ switch 131' prevents $CR_1$ relay 130' being energized. Closing $CR_2$ switch 131 causes current to flow from a ground 140 through $CR_2$ switch 131; switch 134' (closed by a dog 77 on the function drum 78—the only dog at station 0 of the drum); a line 135; switch 138; solenoid 91; a line 136; switch 125; rectifier 124 to ground, energizing solenoid 91, and accordingly, raising shaft 85 (Fig. 2). Raising shaft 85 raises pawl 80 releasing ratchet 79, thereby causing drum 78 to index to station 1. This, however, opens switch 134' rendering the ground 140 ineffective. To compensate for this, shaft 85 as it begins to rise closes switch 137 so that a complete index is effected. Near the upper end of the travel of shaft 85, switch 138 is opened by it, thereby de-energizing solenoid 91 and permitting shaft 85 to descend rapidly under the influence of spring 86 so that the finger 81 of pawl 80 engages the next succeeding notch on the ratchet 79.

Closing $CR_2$ switch 134 energizes solenoid $64_2$ permitting oil under pressure to flow from line 63 only to the manifold part 64' including valves 68, 69 and 70. Since $CR_1$ switch 141 is open, solenoid $64_1$ is de-energized and oil does not flow to manifold portion 64.

Station 1 of drum 78 includes dogs 77 in line with valves 66, 70; and in line with switches 142, 143 and 144. Accordingly, when drum 78 is indexed to station 1, valve 66 is depressed but nothing happens since no oil is supplied to manifold portion 64. Valve 70 is depressed and would cause oil to flow from the manifold portion 64' through line 76, except for the fact that detector switch 96 is closed. Since switch 96 is closed current flows from ground through it, a line 145, ring 102, a line 146, $CR_2$ switch 132, switch 142, line 135, switch 138, solenoid 91, line 136, switch 125, rectifier 124 to ground, energizing solenoid 91 and indexing drum 78 to station 2. From the foregoing, it is evident that when switch 96 is closed, drum 78 will double index from station 0 to station 2 without functioning at station 1.

Station 2 includes dogs 77 in line with valves 67, 69; and in line with switches 147, 143 and 144. Depressing valve 67 causes nothing to happen since only solenoid valve $64_2$ is energized. Depressing valve 69 causes oil to flow from manifold portion 64' through line 75 to the right side of the piston in device 51, forcing clutch 49 into engagement with clutch 47, thereby rotating shaft 11 in a direction to effect leftward movement of the primary means at a rapid rate until switch 97 is closed by engagement with the end 100 of cam 99. Closing switch 97 establishes a circuit from ground through switch 97, a line 148, ring 101, $CR_2$ switch 133, switch 147, line 135, switch 138, solenoid 91, line 136, switch 125, rectifier 124 to ground, energizing solenoid 91 and indexing drum 78 to station 3. Immediately line 75 is exhausted to the atmosphere and neutralizing mechanism 53 disengages clutch 49 from clutch 47 causing the primary means to stop at the intermediate location and such that switch 96 has been opened by finger 96b thereof engaging surface 95a. With the primary means at the intermediate location, the finger 96a is spaced about .030 inch from surface 95.

Station 3 includes dogs 77 in line with valves 65, 68; and in line with switches 142, 143, 144 and 149. Opening switch 149 de-energizes $CR_4$ relay 128 which opens $CR_4$ switch 129'. However $CR_2$ relay 130 does not de-energize because switch 144 is held closed at station 3 by a dog 77 on drum 78. Otherwise $CR_2$ switches 132 and 133 would open and render the detector D ineffective.

Depressing valve 65 again has no result. Depressing valve 68 causes liquid to flow from manifold portion 64' through line 74 to the right side of piston 35, moving clutch 33 into engagement with clutch 34 causing shaft 11 to rotate relatively slowly in a direction to effect relatively slow rightward movement of the primary means until switch 96 is closed by its finger 96a engaging surface 95. Closing switch 96 establishes a circuit from ground through it, line 145, ring 102, line 146, $CR_2$ switch 132, switch 142, line 135, switch 138, solenoid 91, line 136, switch 125, rectifier 124 to ground. This causes energization of solenoid 91 and indexing of drum 78 to its 0 position. Immediately valve 68 exhausts line 74 to the atmosphere and neutralizing mechanism 37 separates clutches 33 and 34, thereby stopping the primary means at the final selected location. When drum 78 arrives at station 0, switch 144 opens de-energizing CR₂ relay 130 opening CR₂ switches 131, 132, 133, 134; and closing CR₂ switch 131'. This places the apparatus in the condition in which it was prior to pushing starting button 127.

Moving handle 103 of the selector S to the position rendering effective the detector unit 93', and pressing the start button 127, energizes CR₄ relay 128, thereby closing CR₄ switches 129'. Closing CR₄ switch 129 holds CR₄ relay 128 after button 127 is released. Closing CR₄ switch 129' energizes CR₂ relay 130 which closes CR₂ switches 131, 132, 133, 134 and opens CR₂ switch 131'. Opening CR₂ switch 131' prevents CR₁ relay 130' from being energized. Closing CR₂ switch 134 energizes solenoid 64₂ supplying liquid under pressure to manifold portion 64'. Closing CR₂ switch 131 establishes a circuit from ground 140 through CR₂ switch 131, switch 134' (closed by dog 77 on drum 78), line 135, switch 138, solenoid 91, line 136, switch 125, rectifier 124 to ground, energizing solenoid 91 and indexing drum 78 from station 0 to station 1.

Station 1 includes dogs 77 in line with valves 66, 70; and in line with switches 142, 143 and 144. Since detector unit 93' is set so that switch 96' is open, the drum 78 does not immediately index to station 2. Depressing valve 66 causes nothing to happen since there is no oil in the manifold portion 64. Depressing valve 70 causes oil under pressure to flow through line 76 to the left-hand side of the piston in device 51, moving clutch 49 into engagement with clutch 46 and thereby causing gear 40 to rotate shaft 11 at a rapid rate in a direction to cause rightward relatively rapid motion of the primary means until switch 96' closes by its finger 96a' engaging surface 95'. Closing switch 96' establishes a circuit from ground through it, a line 150, ring 102, line 146, CR₂ switch 132, switch 142, line 135, switch 138, solenoid 91, line 136, switch 125, rectifier 124 to ground, energizing solenoid 91 and indexing drum 78 to station 2. Immediately, line 76 is exhausted and neutralizing mechanism 53 disengages clutches 49 and 46 stopping the primary means on the side of the final, selected location opposite that of the intermediate location.

The dogs at station 2 depress valves 67 and 69, but only valve 69 is effective, as previously explained. Switches 147, 143 and 144 are closed while switch 142 opens. Depressing valve 69 causes liquid under pressure to flow through line 75 to the right side of the piston of device 51, moving clutch 49 into engagement with clutch 47, whereupon gear 43 rotates shaft 11 at a fast rate and in a direction to move the primary means leftwardly at a relatively fast rate until switch 97' closes by contacting cam 99'. Closing switch 97' establishes a circuit from ground through it, a line 151, ring 101, CR₂ switch 133, switch 147, line 135, switch 138, solenoid 91, line 136, switch 125, rectifier 124 to ground, energizing solenoid 91 and indexing drum 78 to station 3. Immediately the transmission is neutralized by device 53 and the primary means comes to rest at the intermediate location with switch 96' open and its finger 96a' spaced about .030 inch from surface 96'. The dogs 77 at station 3 depress valves 65, 68 and switches 142, 143, 144 and 149. Opening switch 149 de-energizes CR₄ relay 128 causing CR₄ switch 129' to open. However, CR₂ relay 130 remains energized since switch 144 is closed by a dog on drum 78. Depressing valve 65 is ineffective due to the lack of oil. Depressing valve 68 causes oil under pressure to pass through line 74 to the right side of piston 35, causing clutch 33 to engage clutch 34, whereupon gear 31 rotates shaft 11 at a slow speed and in a direction to move the primary means rightwardly at a slow speed until switch 96' is closed by its finger 96a' contacting surface 95'. Closing switch 96' establishes a circuit from ground through it, line 150, ring 102, line 146, CR₂ switch 132, switch 142, line 135, switch 138, solenoid 91, line 136, switch 125, rectifier 124 to ground, energizing solenoid 91 and indexing drum 78 to station 0. When the drum indexes to station 0, the dog 77 permits valve 68 to rise, exhausting line 74 which permits neutralizing mechanism 37 to disengage clutch 33 from 34, whereupon the primary means comes to rest at the final, selected location.

When drum 78 arrives at station 0, switch 144 opens de-energizing CR₂ relay 130 causing CR₂ switches 131, 132, 133 and 134 to open and CR₂ switch 131' to close placing the apparatus in the condition it was in prior to pushing button 127.

There is an identical selector S' and detector D' for controlling the rotation of shaft 10. The shaft 10, as previously explained may be employed to move a primary means vertically as is the case in moving the spindle in a horizontal boring mill. The detector D' includes a plurality of units 152, 152' identical with units 93, 93'. The units 152, 152' include "self-locking" switches 153, 153', as well as "self-returning" switches 154, 154'. They also include rods 155, 155' having cams 156, 156' and surfaces 157, 157'.

With the handle of selector S' in position to render effective the unit 152, pushing starting switch 158 energizes CR₃ relay 159 closing CR₃ switches 158' and 160. Closing CR₃ switch 158' holds CR₃ relay 159 energized after release of the starting button 158. Closing CR₃ switch 160 energizes CR₁ relay 130' thereby opening CR₁ switch 161, preventing energization of CR₂ relay 130, and closing CR₁ switches 141, 162, 163 and 164. Closing CR₁ switch 164 energizes solenoid 91 indexing drum 78 to station 1. However, since switch 153 is closed, solenoid 91 is re-energized immediately indexing drum 78 to station 2. At station 2, valves 67 and 69 are depressed, but since only oil valve 64₁ is now energized (CR₂ switch 134 is open and CR₁ switch 141 is closed), valve 67 is the only one effective causing gear 42 to rotate shaft 10 rapidly and thereby moving the primary means downwardly at a fast traverse rate until switch 154 closes thereby energizing solenoid 91. This indexes drum 78 to station 3 and stops the primary means at the intermediate location such that switch 153 is open and about .030 inch below surface 157. At station 3, valve 65 is depressed causing gear 14 to move the primary means slowly upwardly until switch 153 closes, whereupon the solenoid 91 is again energized, indexing drum 78 to its 0 station and the apparatus is again in condition to have another selection made.

Moving the handle of selector S' to a position rendering effective unit 152', and closing push button 158 again energizes CR₃ relay 159, thereby closing CR₃ switches 158' and 160 as before. CR₁ relay 130' thereupon is energized opening CR₁ switch 161 and closing CR₁ switches 141, 162, 163 and 164. Closing of CR₁ switch 164 energizes solenoid 91 indexing drum 78 to station 1 where valve 66 is depressed causing clutch 48 to engage 44, whereupon gear 39 rotates shaft 10 rapidly effecting upward traverse movement of the primary means until switch 153' closes.

Closing switch 153' effects indexing of drum 78 to station 2 where valve 67 is depressed causing downward traverse of the primary means until switch 154' closes. Closing of switch 154' effects indexing of drum 78 to station 3 where valve 65 is depressed causing gear 14 to move the primary means upwardly slowly until switch 153' again closes, stopping the primary means at the final, selected location and re-conditions the apparatus, as above-explained, for another selection.

Although the various features of the new and improved positioning apparatus have been shown and described in detail to fully disclose one embodiment of the invention, it will be evident that numerous changes may be made in such details and certain features may be used without others, without departing from the principles of the invention.

What is claimed is:

1. Apparatus comprising in combination, a primary means adapted automatically to be positioned at more than two final locations, one at a time, along a path of travel; a secondary means comprising more than two units each including relatively adjustable elements for determining one of the final locations at which said primary means is to be located; a tertiary means having a position for indicating each unit of the secondary means, and a member adapted to be located in any of said positions to determine the unit of the secondary means desired; a function-selecting means including a plurality of portions adapted to cause said primary means successively to move first in one, then in the other direction; and means for rendering effective successive of the portions of said function-selecting means.

2. Apparatus comprising in combination, a primary means adapted automatically to be positioned at more than two final locations, one at a time, along a path of travel; a secondary means comprising more than two units each including relatively adjustable elements for determining one of the final locations at which said primary means is to be located as well as a corresponding intermediate location, said intermediate location bearing a fixed relation to its corresponding final location; a tertiary means having a position for indicating each unit of the secondary means, and a member adapted to be located in any of said positions to determine the unit of the secondary means desired; a function-selecting means including a plurality of portions adapted to cause said primary means successively to move first in one, then in the other direction at a relatively rapid speed, and finally in the first direction at a relatively slow speed; and means for rendering effective successive of the portions of said function-selecting means.

3. In a positioning apparatus for a machine tool, a support adapted automatically to be positioned at more than two final locations, one at a time, along a path of travel; a detector comprising a unit for each position to which said support is to be located, each unit including circuit-making and breaking elements relatively adjustable throughout the entire path of travel of the support; a selector for determining the unit of the detector desired; a function-selecting means including a plurality of portions adapted to cause said support successively to move first in one, then in the other direction; and means for rendering effective successive of the portions of said function-selecting means.

4. In a positioning apparatus for a machine tool, a support adapted automatically to be positioned at more than two final locations, one at a time, along a path of travel; a detector comprising a unit for each position to which said support is to be located, each unit including a circuit-making and breaking element for determining one of the final locations and another circuit-making and breaking element for determining an intermediate location that bears a fixed relation to its corresponding final location; an actuating member for each unit adapted to be adjusted relatively to its corresponding circuit-making and breaking elements throughout the extent of the path of travel of the support; a selector for determining the unit of the detector desired; a function-selecting means including a plurality of portions adapted to cause said support successively to move first in one, then in the other direction at a relatively rapid speed until said support reaches said intermediate location, and thence in the first direction at a relatively slow speed until said support arrives at said final, selected location; and means for rendering effective successive of the portions of said function-selecting means.

5. Apparatus comprising in combination, a primary means adapted automatically to be positioned at more than two final locations, one at a time, along a path of travel; a secondary means comprising more than two units each including relatively adjustable elements for determining one of the final locations at which said primary means is to be located; a tertiary means having a position for indicating each unit of the secondary means, and a member adapted to be located in any of said positions to determine the unit of the secondary means desired; a motion-determining member adapted to be indexed from station to station and including means at successive stations for initiating the movement of said primary means first in one, then in the other direction; and means for indexing said motion-determining member from station to station.

6. Apparatus comprising in combination, a primary means adapted automatically to be positioned at more than two final locations, one at a time, along a path of travel; a secondary means comprising more than two units each including relatively adjustable elements for determining one of the final locations at which said primary means is to be located; a tertiary means having a position for indicating each unit of the secondary means, and a member adapted to be located in any of said positions to determine the unit of the secondary means desired; a fourth means requiring a non-selective act to initiate it and including a drum adapted to be indexed from station to station and having means at successive stations for causing said primary means to move first in one, then in the other direction; and means rendered effective by said non-selective act for indexing said drum from station to station.

7. Apparatus comprising in combination, a primary means adapted automatically to be positioned at more than two final locations, one at a time, along a path of travel; a secondary means comprising more than two units each including relatively adjustable elements for determining one of the final locations at which said primary means is to be located as well as a corresponding intermediate location, said intermediate location bearing a fixed relation to its corresponding final location; a tertiary means having a position for indicating each unit of the secondary means, and a member adapted to be located in any of said positions to determine the unit of the secondary means desired; a function-selecting means including a plurality of portions adapted to cause said primary means successively to move first in one, then in the other direction at a relatively rapid speed and finally in the first direction at a relatively slow speed; and means for rendering effective successive of the portions of said function-selecting means.

8. Apparatus comprising in combination, a primary means adapted automatically to be positioned at more than two locations, one at a time, along a path of travel; means for moving said primary means to said final locations; a secondary means comprising a unit for each location, each unit including a locking switch and actuator relatively adjustable throughout the path of travel of said primary means for determining one of said locations at which said primary means is to be located; a tertiary means having a position for indicating each unit of said secondary means, and a member adapted to be located in any of said positions to determine the unit of the secondary means desired; a function-selecting means including a plurality of portions adapted to cause said primary means successively to move first in one, then in the other direction; and means for rendering effective the correct portion of said function-selecting means to initially cause said primary means to move toward the final location determined by the unit of the secondary means selected by the tertiary means.

9. Apparatus comprising in combination, a primary means adapted automatically to be positioned at more than two locations, one at a time, along a path of travel; means for moving said primary means to said final locations; a secondary means comprising a unit for each location, each unit including a locking switch and actuator relatively adjustable throughout the path of travel of said primary means for determining one of said locations at which said primary means is to be located; a tertiary means having a position for indicating each unit of said secondary means, and a member adapted to be located in any of said positions to determine the unit of the secondary means desired; a function-selecting means adapted to be indexed from station to station and including means at succeeding stations for causing said primary means successively to move first in one, then in the other direction; and means requiring a nonselective act to initiate it for indexing said function-selecting means to the correct station for effecting initial movement of said primary means toward said final, selected location.

10. Apparatus comprising in combination, a primary means adapted automatically to be positioned at more than two final locations, one at a time, along a path of travel; a secondary means adapted to be adjusted to determine each final location as well as an intermediate location therefor, each of said intermediate locations bearing a fixed relation to its respective final location; a tertiary means adapted to be operated to select, one at a time, any of the final locations determined by said secondary means; a motion-determining drum adapted to be indexed from station to station including means at succeeding stations for causing said primary means successively to move first in one, then in the other direction at a relatively rapid speed, until it arrives at said intermediate location, and finally in the first direction at a relatively slow speed until it arrives at said final, selected location; and means for indexing said drum so that one or the other of the stations for effecting said relatively rapid movement of said primary means becomes effective depending upon the initial position of the primary means relatively to said final, selected location.

11. Apparatus comprising in combination, primary means adapted automatically to be positioned at more than two final locations, one at a time, along a path of travel; secondary means including more than two units each comprising relatively adjustable elements for determining one of the final locations of said primary means, as well as an intermediate location that is always on the same side as, and bears a fixed relation to said final location; tertiary means having a position for indicating each unit of the secondary means, and a member adapted to be located in any of said positions to determine the unit of the secondary means desired; a function drum adapted to be indexed from station to station and including means at a first station for causing said primary means to move at a relatively rapid rate toward and beyond said final, selected location in one direction; means at a second station for causing said primary means to move at a relatively rapid rate toward and beyond said final, selected location in the opposite direction; means at a third station for causing said primary means to move at a relatively slow speed to said final, selected location; and means for indexing said drum to said first station when said primary means initially is on the same side of said final location as said intermediate location, and for double indexing said drum to said second station when said primary means initially is on the opposite side of said final, selected location from said intermediate location.

12. Apparatus comprising in combination, a primary means adapted automatically to be positioned at more than two final locations, one at a time, along a path of travel; a secondary means comprising more than two units, each including relatively adjustable elements for determining one of the final locations at which said primary means is to be located; a tertiary means having a position for indicating each unit of said secondary means, and a member adapted to be located in any of said positions to determine the unit of the secondary means desired; a function drum adapted to be indexed from station to station and including means at successive stations thereof for causing said primary means to move first in one, then in the other direction; and a relay circuit adapted when rendered effective to cause said drum to be indexed to one or the other of said successive stations depending upon the location of the primary means when said circuit is rendered effective.

13. Apparatus comprising in combination, a primary means adapted automatically to be positioned at more than two final locations, one at a time, along a path of travel; secondary means comprising more than two units, each including a switch and switch-actuating means relatively adjustable for determining one of the final locations at which said primary means is to be located, and arranged so that said switch is open or closed depending upon the side of said final location the primary means is initially located; tertiary means having a position for indicating each unit of said secondary means, and a member adapted to be located in any of said positions to determine the unit of the secondary means desired; a function drum adapted to be indexed from station to station and including means at successive stations thereof for causing said primary means to move first in one, then in the other direction; and a relay circuit adapted when rendered effective to cause said drum to be indexed to one of said stations when said switch is open, and to be indexed to the other of said stations when said switch is closed.

14. Apparatus comprising in combination, a primary means adapted automatically to be positioned at more than two final locations, one at a time, along a path of travel; secondary means comprising more than two units, each including a switch and switch-actuating means relatively adjustable for determining one of the final locations at which said primary means is to be located, and another switch and switch-actuating means for determining an intermediate location that bears a fixed relation to said final location, the arrangement being such that said final-location switch is open or closed depending upon the side of said final location said primary means is initially located; tertiary means having a position for indicating each unit of said secondary means, and a member adapted to be located in any of said positions to determine the unit of the secondary means desired; a function-selecting means adapted to be indexed from station to station; a relay circuit adapted when rendered effective to index said function-selecting means to a first station when said final-location switch is open for moving said primary means at a relatively rapid rate in one direction and until said final-location switch is closed; means for indexing said function-selecting means to the next succeeding station when said final-location switch is closed causing said primary means to move in the opposite direction at a relatively rapid speed until said intermediate location switch is closed; and means for indexing said function-selecting means to the next succeeding station for causing said primary means to move at a relatively slow rate in the first direction and until said final-location switch is again closed.

15. Apparatus comprising in combination, a primary means adapted automatically to be positioned at more than two final locations, one at a time, along a path of travel; secondary means comprising more than two units, each including a switch and switch-actuating means relatively adjustable for determining one of the final locations at which said primary means is to be located and another switch and switch-actuating means for determining an intermediate location that bears a fixed relation to said final location, the arrangement being such that said final-location switch is open or closed depending upon the side of said final location said primary means is initially located; tertiary means having a position for indicating each unit of said secondary means, and a member adapted to be located in any of said positions to determine the unit of the secondary means desired; a function-selecting means adapted to be indexed from station to station; a relay circuit adapted when rendered effective to double index said function-selecting means to said second station when said final-location switch is closed to cause said primary means to move at a relatively rapid rate in the correct direction toward and until said intermediate switch is closed; and means rendered effective by said primary means arriving at said intermediate location for indexing said function-selecting means to the next succeeding station for causing said primary means to move in the opposite direction at a relatively slow speed until said final-location switch is closed.

16. In a positioning apparatus for a machine tool, a support adapted automatically to be positioned at more than two final locations, one at a time, along a path of travel; a detector comprising a unit for each position to which said support is to be located, each unit including circuit-making and breaking elements relatively adjustable throughout the entire path of travel of the support; a selector for determining the unit of the detector desired; a function-selecting means adapted to be indexed from station to station; means at succeeding stations for causing said support to move first in one, then in the other direction; and a control circuit adapted to be rendered effective by a non-selective act and including means for automatically indexing said function-selecting means to the correct station for initially causing said support to move toward the final, selected location in accordance with the setting of the unit of the detector selected by the selector.

17. In a positioning apparatus for a machine tool, a support adapted automatically to be positioned at more than two final locations, one at a time, along a path of travel; a detector comprising a unit for each position to which said support is to be located, each unit including a circuit-making and breaking element for determining one of the final locations and another circuit-making and breaking element for determining an intermediate location that bears a fixed relation to its corresponding final location; an actuating member for each unit adapted to be adjusted relatively to its corresponding circuit-making and breaking elements throughout the extent of the path of travel of the support; a selector for determining the unit of the detector desired; a function-selecting means adapted to be indexed from station to station; means at succeeding stations for causing said support to move first in one, then in the other direction at a relatively rapid speed, and finally in the first direction at a relatively slow speed; and a control relay circuit for automatically causing said function-selecting means to be indexed to said succeeding stations to cause said support to move at a relatively rapid rate to said intermediate location and thence at a relatively slow rate to the final, selected location determined by the setting of the unit of the detector selected by the selector.

18. In a positioning apparatus for a machine tool, a support adapted automatically to be positioned at more than two final locations, one at a time, along a path of travel; a detector comprising a unit for each position along said path at which said support is to be located, each unit including a switch and switch-actuator adjustable relatively to said switch throughout the extent of the path of travel of said support for determining one of the final locations, and arranged so that said switch is open or closed depending upon the side of said final location the support is initially located; a selector for determining the unit of the detector desired; a function-selecting means adapted to be indexed from station to station; means at a first station to cause said support to move in one direction; means at the next succeeding station for causing said support to move in the opposite direction; and a relay circuit which when rendered effective causes said function-selecting means to be indexed to said first station when said switch is open, and double indexed to said second station when said switch is closed.

19. In a positioning apparatus for machine tools, a support adapted automatically to be positioned at more than two final locations, one at a time, along a path of travel; a detector comprising a unit for each position at which said support is adapted to be located, each unit including one switch and switch-actuator for determining one of said final locations, and another switch and switch-actuator for determining an intermediate location that bears a fixed relation to said final location, said switches and switch-actuators being relatively adjustable throughout the extent of the path of travel of said support; a selector for determining the unit of said detector desired; a function-selecting means adapted to be indexed from station to station; means at a first station for causing said support to move at a relatively rapid rate in one direction; means at a second station to cause said support to move at a relatively rapid rate in the opposite direction; means at a third station to cause said support to move in the first direction at a relatively slow rate of speed; a relay circuit adapted when rendered effective to index said function-selecting means to said first station when said final-location switch is open, causing said support to move at a relatively rapid rate until said final-location switch closes; means rendered effective by the closing of said final-location switch for indexing said function-selecting means to said second station for causing said support to move at a relatively rapid rate in the opposite direction until said intermediate location switch closes; and means rendered effective upon the closing of said intermediate-location switch for indexing said function-selecting means to said third station for causing said support to move at a relatively slow rate in said one direction until said final location switch is again closed.

20. In a positioning apparatus for machine tools, a support adapted automatically to be positioned at more than two final locations, one at a time, along a path of travel; a detector comprising a unit for each position at which said support is adapted to be located, each unit including one switch and switch-actuator for determining one of said final locations, and another switch and switch-actuator for determining an intermediate location that bears a fixed relation to said final location, said switches and switch-actuators being relatively adjustable throughout the extent of the path of travel of said support; a selector for determining the unit of said detector desired; a function-selecting means adapted to be indexed from station to station; means at three succeeding stations of said function-selecting means for causing said support successively to move at a relatively rapid rate in one direction, thence at a relatively rapid rate in the opposite direction, and finally at a slow rate in the first direction; a relay circuit adapted when rendered effective to double index said function-selecting means to said second station when said final-location switch is closed causing said support to move at a relatively rapid rate in a direction toward and until said intermediate switch is closed; and means rendered effective by the closing of said intermediate switch for indexing said function-selecting means to said third station for causing said support to move in the opposite direction at a relatively slow speed until said final-location switch is closed.

21. Apparatus comprising in combination, primary means movable in two directions along a path of travel and adapted automatically to be positioned at a pre-determined location therealong; secondary means comprising a self-locking switch and switch-actuator relatively adjustable throughout the extent of travel of said primary means for determining said predetermined location; a function-selecting means adapted to be indexed from station to station; means at succeeding stations for causing said primary means to move in opposite directions; and means requiring a non-selective act to initiate it for indexing said function-selecting means to the correct station for initiating the correct direction of motion of said primary means initially to cause it to move in the correct direction toward said pre-determined location.

EDWARD P. BULLARD, III.

REFERENCES CITED

The following references are of record in the file of this patent:

UNITED STATES PATENTS

| Number | Name | Date |
| --- | --- | --- |
| 2,351,921 | Bullard | June 20, 1944 |
| 2,352,183 | Bullard | June 27, 1944 |
| 2,352,184 | Bullard | June 27, 1944 |
| 2,352,185 | Bullard | June 27, 1944 |
| 2,355,625 | Bullard | Aug. 15, 1944 |
| 2,384,809 | Bullard | Sept. 18, 1945 |
| 2,427,493 | Bullard | Sept. 16, 1947 |

Certificate of Correction

Patent No. 2,500,796                                                  March 14, 1950

EDWARD P. BULLARD, III

It is hereby certified that error appears in the printed specification of the above numbered patent requiring correction as follows:

Column 9, line 11, for "switches 129'" read *switches 129 and 129'*;

and that the said Letters Patent should be read with this correction therein that the same may conform to the record of the case in the Patent Office.

Signed and sealed this 25th day of July, A. D. 1950.

[SEAL]

THOMAS F. MURPHY,
*Assistant Commissioner of Patents.*